UNITED STATES PATENT OFFICE 2,001,038

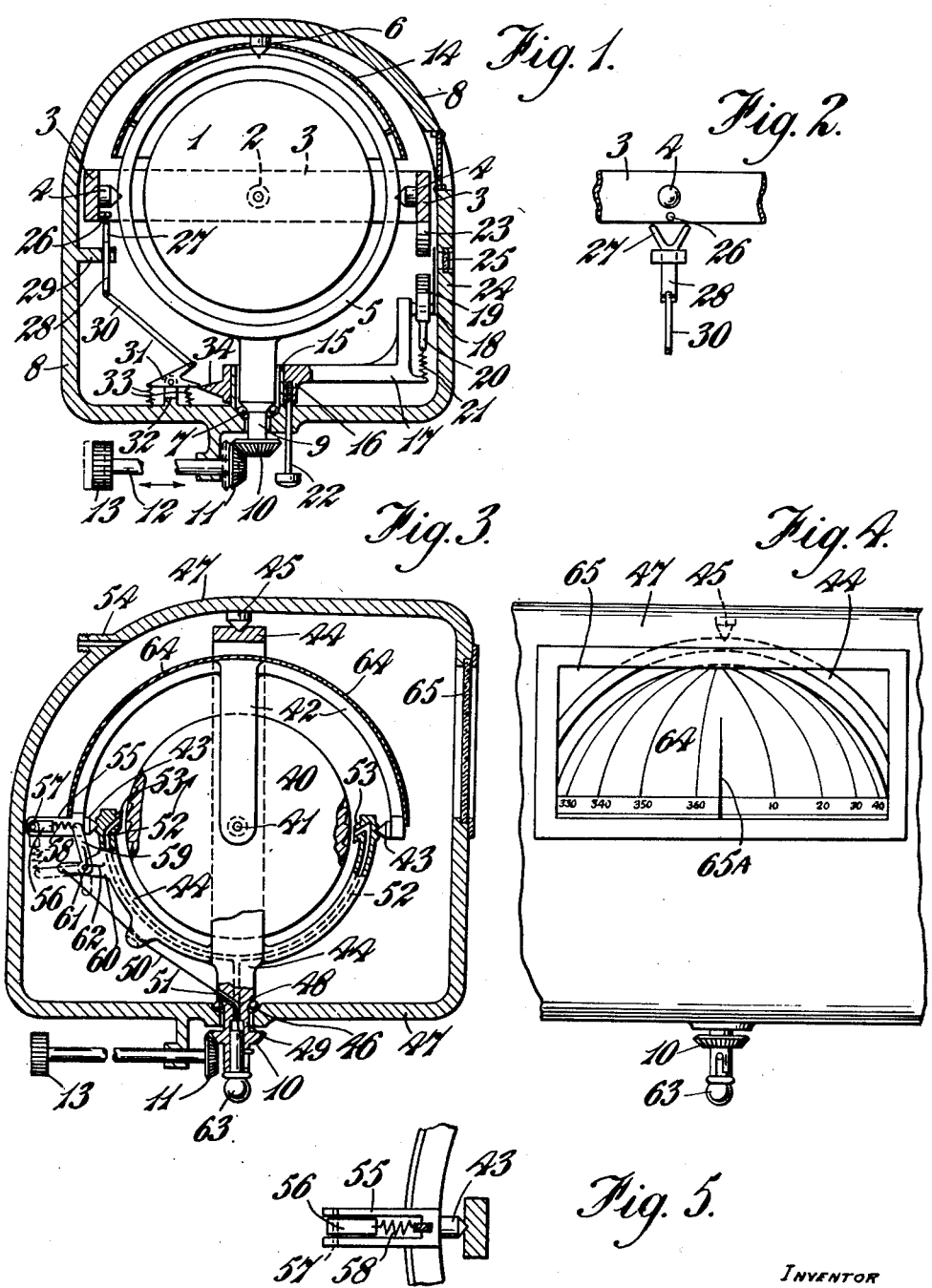

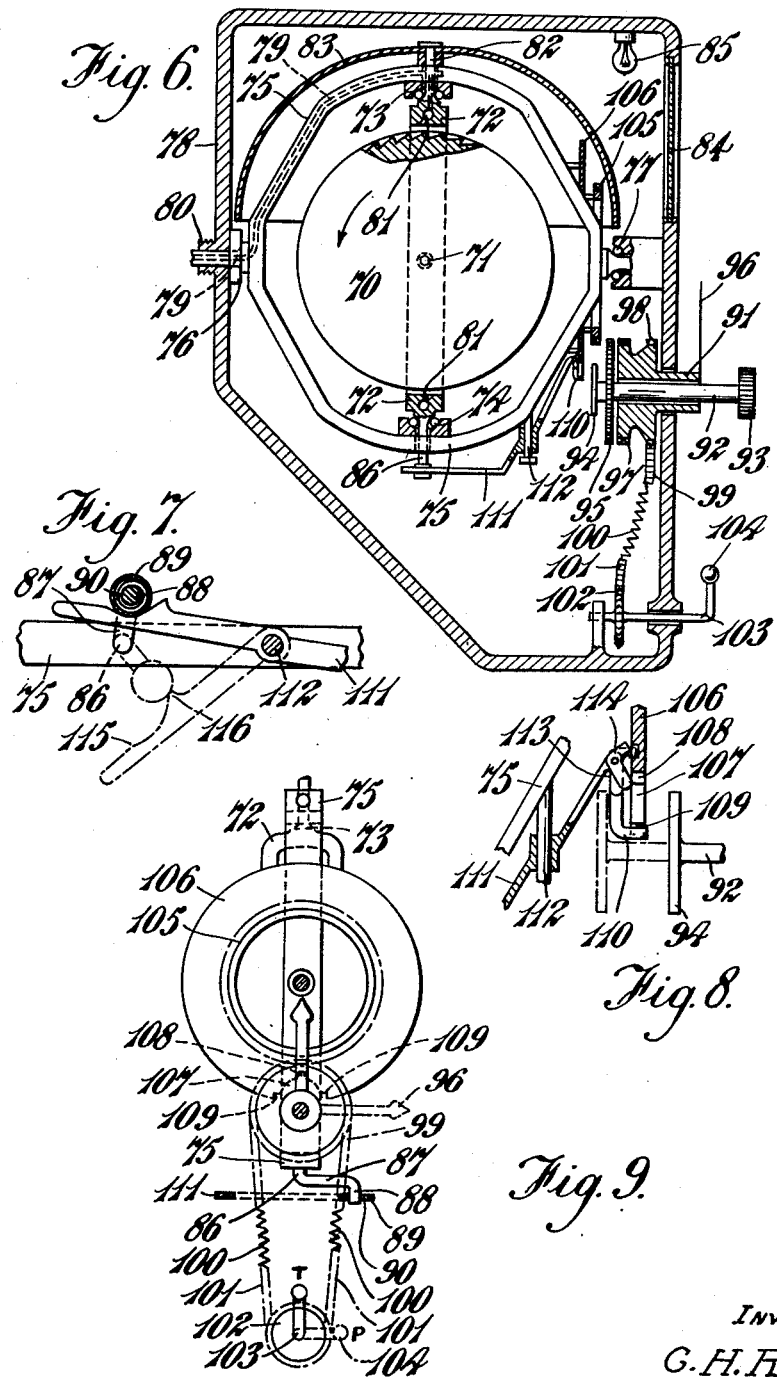

GYROSCOPIC INDICATOR FOR USE WITH AIR AND OTHER CRAFT

George Hancock Reid, London, England

Application January 23, 1934, Serial No. 707,970
In Great Britain January 23, 1933

16 Claims. (Cl. 33—204)

This invention has reference to gyroscopic instruments for observing attitude change for example of aircraft, about two axes, and to combining therein the property of being able to ascertain the rate of change of attitude about one or either of such axes at will by suitable manipulation or control.

An object of the invention is the provision of an instrument from which the varying attitudes of an aeroplane in flight may be seen or estimated.

A further object is to provide a combined attitude indicator and rate-of-turn or rate-of-pitch indicator particularly for aircraft.

A further object is the provision of a combination instrument by virtue of which the user may be enabled to fly constant or slightly varying courses with a measure of accuracy or, at will, to effect chosen rates of turn or other manœuvres depending on a knowledge of angular rates.

A further object is the provision of an instrument in which a "free gyro" instrument may be almost instantaneously converted into a "restrained gyro" instrument.

Before describing my invention it will be as well to enlarge somewhat on the known art. For the purposes of aviation in general and instrument flying in particular gyroscopes have hitherto been applied in two ways. They are either given three axes of freedom and provided with gimbals in two axes so that (subject to terrestrial effect, latitude change and the like) they give an indication of attitude in space, e. g. of bank and pitch, or of bearing without reference to rate of change of bearing; or they have two axes of freedom about one of which they are yieldingly restrained, in which case rate of angular movement, e. g. sense and rate of yaw, is shown, as in the well known gyroscopic turn indicator. In either case, it is of great importance that gimbal as well as gyro bearings are as friction-free as possible and that driving torque is not much disturbed or allowed to bias the gyro.

The present invention seeks to combine the two types of instrument in one; thus the value of the "free" type for relatively straightforward flying is linked with that of the turn indicator which for its part may be chiefly valuable in precise manœuvre, turns, recovery from spins, and military or other exact operations. Moreover, in one form the user may have the option of rate of turn or rate of pitch, in itself a potentially valuable feature.

The drawings show three modifications of the invention, each by way of example, and all having the common feature of adaptability above mentioned.

Figures 1 and 2 relate to one form, diagrammatically, Fig. 1 being a side elevation in part section and Fig. 2 an elevation at right angles thereto of a detail;

Figures 3, 4 and 5 relate to a second form, Fig. 3 being a view in part-sectional elevation, Fig. 4 a broken frontal elevation of the instrument, Fig. 5 an under plan of a detail of Fig. 3;

Figures 6–9 relate to the third form; Fig. 6 is a part-sectional elevation, Fig. 7 shows a detail in under plan and enlarged, Fig. 8 an enlarged detail from Fig. 6, Fig. 9 a diagrammatical elevation of Fig. 6 in direction of arrow 9.

In Figures 1 and 2, a gyro wheel 1 spun by suitable means such as air jets or electrical is rotatable on a spindle 2 in a gimbal ring 3 which is carried on bearings 4 by a gimbal ring 5, which in turn has bearings 6 and 7 by which it is freely carried in a stationary frame or case 8. The bottom bearing 7 is axially hollow and a spindle 9 of gimbal 5 projects therethrough and carries a bevel gear 10 adapted to be engaged by a like gear 11 fast on a slightly slidable shaft 12 with an accessible finger knob 13; sliding the shaft 12 inwards meshes the gears 10, 11 so that the knob 13 can be used to lock and adjustably rotate the gimbal 5 about the vertical axis in which the bearings 6, 7 lie, carrying of course, the gyro 1 for orientation. The shaft 12 is frictionally held against casual displacement. Indicating means or visible means will be provided so as to show when the gyro 1 is correctly orientated for the next operation.

In the initial state it is assumed that knob 13 is retracted; it follows that the gyro is then a free gyro, i. e. it can rotate on its own axis, about 2, and that axis is angularly free on axis 4, 4, as well as on axis 6, 7. A dome-like scale element such as 14 is rigid with glmbal 5 so that rotation of that gimbal about axis 6, 7 can be observed. This is the "turn" or "course" scale, rendered visible by a suitable window in the outermost casing of the instrument. A scale or marking of the gimbal 3 is likewise visible and shows the rotation of the gimbal 3 about axis 4, 4, and this is the "bank" indicator if gyro axis 2 be athwart the course, or the "pitch" indicator if this axis be aligned with the course. By so marking the periphery of gimbal 3 with the words "bank" and "pitch" use may be made of the instrument in either case, but preferably stops limit the extent of angular freedom of the gimbals so that say, 40° only will be shown, in the planes of bank and azimuth; such a scope is deemed adequate for steady flight.

On a sleeve bearing 15 integral with casing 8 is slidably mounted a boss 16 with a radial branch 17 which carries on a pivot at 18 a toothed quadrant or arcuate rack 19 with a depending arm 20 anchored by a tension spring 21 to branch 17. Spring 21 is the precisely set "rate of turn" spring. The boss 16 with carried parts can be raised at will by a push 22 slidable in casing 8, until rack 19 engages fairly with a like toothed quadrant 23 rigid with gimbal 3. The push element 22 is held with sufficient friction to maintain the parts in set position against casual displacement. After this engagement it will be evident that the gimbal 3 can only tilt on axis 4—4 under restraint of spring 21. A needle or like index 24 moving with rack 19 and visible through a window 25, can thus be used to observe rate of turn, provided of course gimbal 5 be locked and gyro 1 be suitably orientated, by previous pressure and rotation of knob 13.

In order to ensure that gimbal 3 and gyro 1 be temporarily orientated in zero attitude at the moment of engaging parts 19 and 23 (and thereafter be free only under spring restraint) the following provision is made. A pin 26 fast in gimbal 3 and virtually below bearing 4, is engageable by a divergent-armed fork 27 extending upwardly from a sliding stem 28 which is borne in a bush at 29 by the casing 8. The stem 28 is linked by an articulated rod 30 to a trigger 31 pivoted to lug 32 of casing 8. Two tension (or compression) springs 33 normally equalize to hold trigger 31 in mid-position. A catch 34 projects from boss 16 so as to engage trigger 31 in the upward motion of boss 16. This will only occur after proper orientation by knob 13, which aligns parts 31 and 34. Thus, when 22 is raised the fork 27 is raised with it at a chosen phase of the operation, so that the pin 26 is forced into a central position and gimbal 3 is restrained positively, until the proper teeth of 19 and 23 have meshed, after which 34 releases 31, so that fork 27 drops to disengage pin 26 and gimbal 3 is free to tilt but restrained by spring 21.

Withdrawal of push 22 idly trips trigger 31 (but use may be made of this to re-orientate gimbal 3 if desired) and disengages 19 from 23. Thereafter knob 13 is retracted to release gimbal 5 and the instrument is again a "free gyro" indicator.

In the modification of Figs. 3, 4 and 5 a gyro 40 has a spindle 41, carried in a gimbal 42 borne on bearings 43 by a second gimbal 44 which has vertical bearings 45, 46 supporting it in a casing 47. The gimbal 44 is hollow coaxially where it passes through the bearing 46, with a bore 48, in a spindle part 49 which has a bevel gear 10, acting with a second gear 11 and knob 13 (as in Fig. 1). The bore 48 has a radial passage in which may run a light-wire cable 50, preferably through a sealing plug of rubber or leather at 51, and also connects external atmosphere with passages 52 in the gimbal 44, which run to jets 53 for driving the gyro, the jets being arranged to exit in the axis of bearings 43, so as not to bias the gyro by disturbing moments. The flow through jets 53 is induced by an exhausting device connected at 54 with the casing 47.

In order to orientate and resiliently restrain the gyro 40 with its gimbal 42 for use as a turn indicator, the gimbal 42 has two parallel extending lugs 55 forming virtually a fork lying coaxial with gimbal bearings 43, and this fork embraces a lever 56 pivoted between lugs 55 at 57, and lying in idle position as shown in Figs. 3 and 5 in full line, but when functional as shown in dotted line in Fig. 3. To this lever 56 is connected the "rate of turn" spring 58, which can house itself between lugs 55. The other end of this tension spring 58 is swivel connected to one arm of a bell-crank 59 pivoted to a lug 60 of gimbal 44 by pivot 61 and normally held as shown in full line (Fig. 3) by a cranked wire spring 62 secured by pins, solder or otherwise to the crank and to the gimbal 44. The other arm of the bell-crank 59 is connected by the cable 50 above mentioned, through plug 51 and bore 48, to a knob 63 with a slot-and-pin bayonet fitting as illustrated clearly in Fig. 4, so that by pulling the knob 63 the cable 50 is tensed, crank 59 is swung on pivot 61 and the spring 55 and lever 56 is swung about 90° on pivot 57 until it is as shown dotted in Fig. 3. This imposes a spring restraint on gimbal 42 in relation to its tilt on bearings 43 and, gimbal 44 being assumed to be locked by knob 13, the gyro immediately acts as a rate-of-turn indicator. In this case the orientation of the gyro to a proper "zero" is automatic, in that the spring 58 cannot fail to be properly connected. The spring by its swivel connection to crank 59 cannot set up a torsional resistance to tilting of gimbal 42 when the spring 58 and lever 57 are in inoperative position, as these parts are free and are in the axis of bearings 43. Suitable indications are given by a dome-like scale 64 carried by gimbal 42. This scale shows azimuth bearing and pitch (or bank) when the gyro is "free" and it shows rate of turn when the gyro is "restrained" by its angular movements about the bearings 43. A window 65 provides for viewing the scale.

Relaxing the knob 63, and thus the cable 50, allows the bell-crank 59 to resume inoperative position under the influence of spring 62.

It is proper to mention that any usual devices as adopted in this class of instrument, for eliminating ill-effects of temperature, for regulating gyro speed, or for other special purposes, may of course be applied in the practical design and construction of this instrument.

Fig. 4 is intended to indicate how the scale of dome 64 may be marked and may appear through window 65, which may have a lubberline or datum mark 65A upon it.

Figs. 6 to 9 show a further embodiment of the invention, in which specific provision is made whereby at choice the "restrained" function of the gyro may be to show rate of turn or rate of pitch.

In this case a gyro 70 has its spindle 71 carried by a gimbal 72 with bearings 73, 74 in a second gimbal 75 in turn borne by bearings 76, 77 of casing 78. The bearings 76, 73 are hollow and with passages 79 and connection 80, constitute an inlet for air under pressure to jets 81 for spinning the gyro. The bearings 76, 73 are arranged to have very closely fitting but not contacting surfaces between relatively moving parts, whereby undue leakage to waste is prevented but friction is not set up, and may even perhaps be reduced. Such a device may well suffice to give a pressure of about one eighth inch of mercury at the jets without immoderate pressure at the source, and this is sufficient under good running conditions, a higher pressure being probably necessary for starting the gyro only.

The bearing 73 has axially through it (and through the gimbal 75) a spindle 82 carrying an index dome 83 viewed through window 84 of casing 78, and perhaps illumined by a lamp 85. The bearing 74 between gimbals 72, 75 has a crankshaft 86 passing coaxially through it, with a crank 87 and crankpin 88, and on the crankpin a rim or tire 89 carried resiliently by a coil spring 90 or a soft rubber bush or other yielding means. This crank device is to orientate gimbal 72 and gyro 70.

The device whereby the above described "free" gyro system may be restrained, is comprised as follows. The casing 78 carries a rotatable sleeve 91 in a very good bearing not specifically illustrated; or this sleeve passes through the casing freely and is borne on the spindle 92 which is then itself suitably borne (which latter is preferred, but not so illustrated in order to simplify description). The spindle 91 has an external knob 93 by which it can be slid axially as well as rotated. At its inner end it carries a disc 94 and, near it, a pinion 95 both fast on the spindle 92 (Fig. 8 shows the disc and attendant parts more clearly). The sleeve 91 carries a pointer 96 which is the "rate" pointer of turn or pitch and which has a suitable scale behind it on the casing 78; needless to say the pointer may if desired be within the casing behind a window.

The sleeve 91 has fast with it a wheel comprising a pinion part 97 and a sprocket 98, the latter having a light chain 99 engaging around it, the ends of chain 99 being connected by "rate" springs 100 to a second chain 101 passing over a sprocket 102 on a rotatably borne spindle 103 with accessible handle 104. Out of use, sprockets 98 and 102 are misaligned, springs 100 relieving the stresses otherwise imposed by the chains, and in operation these sprockets align properly.

Upon gimbal 75 are mounted a pinion 105 and a disc 106, the pinion adapted to be engaged by pinion 95 or 97. The disc 106 has an arcuate recess in its periphery at 107, adapted to allow the overlapping segment of disc 94 to pass therethrough when accurately aligned. The recess 107 has three notches, a central one 108 (the presence and form of which depends upon the form of a detent afterwards mentioned) and two lateral ones 109 at the periphery of the disc 106. When the recess 107 is not aligned with the disc 94, inward axial movement of the disc 94, its spindle and the pinion 95 is prevented by rubbing contact between 94 and 106. In this position pinion 95 engages pinion 105 fairly, so that rotation of knob 93 causes rotation of pinion 95 and thus of gimbal 75 on bearings 76, 77 (with which the disc 106 and pinion 105 are coaxial) and this means is afforded for initial orientation of the gimbal 75. When by first pushing and then unidirectionally turning the knob 93 (according to the direction of an arrow on the knob) the gimbal 75 is rotated, the disc 94 as it commences to cross the recess 107 contacts peripherally with a lug 110 projecting through a notch 109. This lug 110 is the tail end of a lever 111 which is freely but robustly borne on a pin 112 anchored to the gimbal 75. This lever 111, hidden as it were behind the disc 106, projects beyond it through the recess 107 or a notch 108 at all times, and the lever 111 is so bent, at 113 (Fig. 8), that in an inward position the disc 94 clears it completely. The disc moves the lever by contact with lug 110 thereof, across the recess 107, until the lug 110 is entered into the other notch 109 when the recess 107 is clear of obstruction and the disc 94 can enter it, and does so if the user pushes inward on knob 93. In passing through the recess, the disc 94 trips up a detent 114 pivotally carried in the vicinity of 113 by the lever 111, whereby the detent 114 (which is like a bell crank) engages a recess in the back of the disc 106, or if suitably formed may engage the notch 108. A small spring, or the resilience of the detent itself, allows disc 94 to pass it and then causes it to spring down a little so that on the return passage of the disc 94 the detent 114 will be withdrawn from its locking position. It should perhaps be emphasized that the purpose of detent 114 is to lock the lever 111 in the position into which disc 94 has forced it, for so long as the disc 94 is behind the disc 106, and to free it on return of the disc 94. The spindle 92 of course clears the periphery of disc 106 at all times.

The lever 111 has an edge at 115 formed so that it will bear on the tire 89 and from any position will force the crank 87 into a predetermined position; that, in fact, in which the gyro 70 is properly orientated in bearings 73, 74. To this end a cam-like beak 116 is provided on the edge 115. The resilient mounting of the tire 89 ensures that no dead-centre effect will cause the lever 111 to jam against the crank, since in the case where the point of the beak contacts with tire 89, the latter will run one way or the other down the edge 115 and in no other position except that of proper orientation can stable locking or immobilization take place. The lever 111 is therefore a means whereby at the proper phase of operations the gimbal 72 is correctly orientated and locked. A pull-off spring may be provided to retract the lever 111 when it is freed from the locking of detent 114.

Operation is as follows: As a "free gyro" instrument the positions are as shown in Fig. 6 and observation of attitude is made by reference to the dome 83 through window 84. Azimuth bearing and bank may thus be ascertained within the constructional angular limits of the instrument. The user, having elected to observe rate of turn or yaw, sees that handle 104 is set for turn (ensuring thereby that pointer 96 is vertical) he pushes lightly on knob 93 and rotates it. This engages pinions 95 and 105 and forces gimbal 75 around. In due course the periphery of disc 94 bears against lug 110 and, as rotary movement of disc 106 continues, lever 111 is swung on pivot 112 until edge 115 forces crank 87 (and so also gimbal 72 and the gyro 70) into proper orientation. When correctly positioned (i. e. in "zero turn") continued axial pressure on knob 93 pushes disc 94 through recess 107, knocking detent 114 into locked position, and finally the disc 94 is clear of other moving parts. During this phase the sleeve 91 and of course pinion 97 are frictionally dragged inwards and when disc 94 makes its final movement the pinion 95 disengages pinion 105 and the pinion 97 replaces it, putting the "rate" train into operation, so that although gimbal 75 is free from positive restraint it is now spring restrained and will by its behaviour in tilting, show rate of turn. Suitable damping means are of course provided in this and the before-described constructions.

The friction of the mounting of spindle 103 is sufficient to prevent its being rotated gyroscopically but it may be rotated by hand; so that when "rate of pitch" is required to be observed, handle 104 is rotated suitably and this forces the gyro (and of course gimbal 75) into the appropriate attitude, i. e. with the spindle 71 vertical; thereupon the pointer 96 is also rotated to a horizontal attitude at zero to facilitate pitch readings.

Although other means for orientating the gyro may be adopted it must be borne in mind that it has not only to be positioned as to plane of rotation but also sense of rotation, otherwise reversed readings may be expected with attendant confusion and danger.

To revert to "free" use the handle 104 is set at "turn" and knob 93 gently pulled. If turn is taking place, the disc 94 will not clear recess 107, so straight flight must be ensured, when the whole "rate" train disengages and detent 114 by tripping reversely on disc 94, liberates lever 111, all in zero orientation.

What I claim is:—

1. An instrument having a gyro mounted for three degrees of freedom and means capable of selective operation for resiliently restraining movements thereof about one axis of freedom and for preventing movements about a second axis of freedom, whereby the device may selectively function as a directional gyro or as an indicator of the rate of angular velocity.

2. An instrument having a gyro, a first gimbal rotatably supporting the gyro, a second gimbal having bearings supporting the first gimbal, a stationary part of the instrument rotatably supporting the second gimbal, means for locking one gimbal, and means for resiliently restraining the other gimbal against angular movement in its bearings at will, whereby the device may selectively function as a directional gyro or as an indicator of the rate of angular velocity.

3. An instrument having a gyro with three degrees of freedom, and means for selectively preventing freedom in one degree, means for selectively resiliently restricting freedom in a second degree and means for temporarily preventing freedom in this second degree, whereby the device may selectively function as a directional gyro or as an indicator of the rate of angular velocity.

4. An instrument having a gyro with three degrees of freedom, means for imposing resilient restraint to freedom in one degree at will, means for preventing freedom in another degree, means for orientating the gyro in this other degree, whereby the device may selectively function as a directional gyro or as an indicator of the rate of angular velocity about a selected axis.

5. An instrument comprising a gyro, a first gimbal in which the axis of the gyro is freely rotatable, a second gimbal supporting the first gimbal on an axis at right angles to the gyro axis, and a stationary element having bearings to rotatably support the second gimbal on an axis at right angles to both other axes, means for selectively resiliently restraining pivoted movement of the first gimbal at will, and means for selectively locking the second gimbal stationary at will, whereby the device may selectively function as a directional gyro or as an indicator of the rate of angular velocity.

6. An instrument comprising a gyro, a first gimbal in which the gyro spins, a second gimbal supporting the first gimbal on a second axis at right angles to the gyro axis, and a stationary element having bearings to rotatably support the second gimbal on an axis normal to the second axis, manually operable means for relatively locking the two gimbals, and manually operable means for resiliently restraining them relative to the stationary element, whereby the device may selectively function as a directional gyro or as an indicator of the rate of angular velocity.

7. An instrument comprising a gyro, a first gimbal in which the gyro spins, a second gimbal supporting the first gimbal on a second axis at right angles to the gyro axis, and a stationary element having bearings to rotatably support the second gimbal on an axis normal to the second axis, means for relatively resiliently restraining the two gimbals, means for temporarily relatively locking them, and means for locking the second gimbal stationary, whereby the device may selectively function as a directional gyro or as an indicator of the rate of angular velocity.

8. An instrument comprising a gyro, a first gimbal in which the gyro spins, a second gimbal supporting the first gimbal on a second axis at right angles to the gyro axis, and a stationary element having bearings to rotatably support the second gimbal on an axis normal to the second axis, means for relatively resiliently restraining the gimbals, and means for orientating and then locking the second gimbal relative to the stationary element, whereby the device may selectively function as a directional gyro or as an indicator of the rate of angular velocity.

9. A gyroscopic attitude-indicating instrument comprising a gyro, a first gimbal in which the gyro spins, a second gimbal supporting the first gimbal on a second axis at right angles to the gyro axis, and a stationary element having bearings to rotatably support the second gimbal on an axis normal to the second axis, means for locking one of the gimbals stationary about its bearing axis, and means on the other gimbal for relatively restraining it at will about its bearing axis comprising a toothed member adapted to be engaged with a second toothed member angularly movable on said element against spring restraint.

10. An instrument comprising a gyro, a first gimbal for rotatably supporting the gyro for free movement about its axis, a second gimbal having bearings to support the first gimbal on a second axis at right angles to the gyro axis, a stationary element having bearings for the second gimbal on an axis normal to said second axis, means for locking one of the gimbals stationary about its bearing axis, and means for relatively restraining the other gimbal at will about its bearing axis comprising a shiftable spring secured at one end to the other gimbal and adapted in one position to provide a resilient restraining moment about that axis, whereby the device may selectively function as a directional gyro or as an indicator of the rate of angular velocity.

11. An instrument comprising a gyro, a first gimbal in which the gyro is freely rotatable about its axis, a second gimbal having bearings to movably support the first gimbal on a second axis at right angles to the gyro axis, a stationary element having bearings to support the second gimbal on an axis normal to said second axis, an angularly movable resiliently restrained element, and means for engaging this last element with one of the gimbals to restrain said gimbal about its remaining axis of freedom, and means operative during engaging movement of said element to lock the gimbals relatively during engagement of the element and gimbal, said locking means being automatically released following engagement of the element and gimbals to free the gimbals for movement under the restrained influence of the element.

12. An attitude indicator for aircraft having a gyro, a first gimbal having bearings carrying the gyro, a second gimbal having bearings carrying the first gimbal, a stationary part of the instrument having bearings carrying the second gimbal, all three bearings having their axes at right angles to each other with the parts in normal position, indicating means associated with the gyro, means for locking and orienting one gimbal at will, and means for resiliently restraining the other gimbal about its axis for resiliently controlling angular movements of the gyro axis at will, whereby the device may selectively function as a directional gyro or as an indicator of rate of angular displacement of the gyro axis.

13. An indicator for aircraft having a gyro mounted for three degrees of freedom in two gimbals and a stationary element, means for orientating and locking one gimbal, means for resiliently restraining the other gimbal including a part engageable with said gimbal and means for resiliently restraining angular movement of this part, and means for positioning the angularly movable part, whereby this part and the gimbal it engages may be partially rotated, to thereby permit the gyro when having three degrees of freedom to serve as a directional gyro and when said one axis is locked and the other is restrained to serve as a restrained turn indicator.

14. An aircraft instrument comprising a gyro mounted for three degrees of freedom in two gimbals and a stationary element and capable of giving indications of attitude about two axes and also indications of rate of angular movement about one of these axes, and selective means for turning this latter axis through 90° to thereby correlate attitude indications of the gyro in the said two axes to a position parallel with either the longitudinal or lateral axis of the aircraft.

15. An aircraft instrument comprising an air spun gyro mounted on a spindle, a first gimbal supporting said spindle, a second gimbal supporting the first gimbal in normally vertical bearings, horizontally arranged bearings for supporting the second gimbal, means for locking the first gimbal against rotation relative to the second gimbal, means for resiliently restraining the second gimbal against movement about its horizontal axis, means for rotating the gyro about the second gimbal axis to a zero position, and means for indicating tilting movements of the gyro from the vertical plane when it precesses due to angular changes of attitude of the restrained axis of freedom.

16. An aircraft instrument comprising a gyro, a spindle therefor, a first gimbal having bearings for the spindle, a second gimbal having bearings for the first gimbal at right angles to the spindle, a casing having bearings for the second gimbal at right angles to the two other axes, an engageable member moving with the first gimbal, a locking member adapted to engage therewith carried by the second gimbal, a pinion on the second gimbal concentric of its pivot axis, a manually rotatable and axially movable pinion mounted in the casing and adapted to engage said gimbal pinion, an angularly movable element also co-axially movable with the second pinion to engage said gimbal pinion at will, an indicator associated with said element, means resiliently restraining said element against angular movement, means whereby axial movement and rotation of the manually operable pinion causes movement of the gimbal carried locking element to lock said gimbal relatively to the second gimbal for one direction of axial movement and to release the same upon opposite direction of axial movement, indicating means associated with the first gimbal to show its movements about two axes, and means for driving the gyro in a predetermined sense of rotation.

GEORGE HANCOCK REID.